United States Patent
Xue et al.

(10) Patent No.: US 9,537,629 B2
(45) Date of Patent: Jan. 3, 2017

(54) CONTROL CHANNEL MAPPING METHOD AND APPARATUS

(75) Inventors: Lixia Xue, Beijing (CN); Bingyu Qu, Rolling Meadows, IL (US); Lei Guan, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 13/298,080

(22) Filed: Nov. 16, 2011

(65) Prior Publication Data

US 2012/0063401 A1    Mar. 15, 2012

Related U.S. Application Data (63) Continuation of application No. PCT/CN2010/073921, filed on Jun. 13, 2010.

(30) Foreign Application Priority Data

Jun. 16, 2009    (CN) .......................... 2009 1 0107882

(51) Int. Cl.
*H04L 5/00*    (2006.01)

(52) U.S. Cl.
CPC .............. *H04L 5/0037* (2013.01); *H04L 5/001* (2013.01); *H04L 5/0053* (2013.01); *H04L 5/0094* (2013.01); *H04L 5/0007* (2013.01)

(58) Field of Classification Search
CPC ........ H04L 5/005; H04L 5/001; H04L 5/0007; H04L 5/0092; H04W 48/12; H04W 72/042
See application file for complete search history.

(56) References Cited

U.S. PATENT DOCUMENTS

| | | |
|---|---|---|
| 7,054,315 B2 | 5/2006 | Liao |
| 7,733,827 B2 | 6/2010 | Kim et al. |
| | (Continued) | |

FOREIGN PATENT DOCUMENTS

| | | |
|---|---|---|
| CN | 1738473 A | 2/2006 |
| CN | 1968050 A | 5/2007 |
| | (Continued) | |

OTHER PUBLICATIONS

European Search report issued in corresponding European patent application No. EP10788928.9, Mailed Apr. 12, 2012, 8 pages total.

(Continued)

*Primary Examiner* — Jackie Zuniga Abad
(74) *Attorney, Agent, or Firm* — Huawei Technologies Co., Ltd

(57) ABSTRACT

A control channel mapping method is provided, which includes: determining a search space corresponding to each object for a same aggregation level, where more than one object exist and are determined according to a component carrier; and mapping a control channel corresponding to the object into the determined search space. A detection method is further provided, which includes: determining an initial location of a search space corresponding to the object, where more than one search space exist for the same aggregation level, and the object is determined according to a component carrier, and determining a size of the search space corresponding to the object; and detecting a control channel in the determined search space. A User Equipment (UE) and a network equipment are also provided. Therefore, the collision of control channels is reduced, and an impact probability of control channels is reduced.

18 Claims, 4 Drawing Sheets

(56) References Cited

U.S. PATENT DOCUMENTS

| | | | |
|---|---|---|---|
| 7,778,148 B2 | 8/2010 | Lee et al. | |
| 7,852,806 B2 | 12/2010 | Ahn et al. | |
| 7,873,004 B2 | 1/2011 | Lee et al. | |
| 7,920,516 B2 | 4/2011 | Nishio et al. | |
| 7,929,636 B2 | 4/2011 | Kotecha | |
| 2009/0047018 A1 | 2/2009 | Boyd | |
| 2009/0088148 A1* | 4/2009 | Chung et al. | 455/423 |
| 2009/0154607 A1 | 6/2009 | Lindoff et al. | |
| 2009/0238091 A1* | 9/2009 | Kim et al. | 370/252 |
| 2010/0034092 A1 | 2/2010 | Krishnamurthy et al. | |
| 2010/0254268 A1* | 10/2010 | Kim et al. | 370/241 |
| 2010/0254329 A1 | 10/2010 | Pan et al. | |
| 2010/0279628 A1* | 11/2010 | Love | H04L 5/0091 455/70 |
| 2010/0281323 A1 | 11/2010 | Wang et al. | |
| 2010/0303011 A1* | 12/2010 | Pan et al. | 370/328 |
| 2011/0070845 A1 | 3/2011 | Chen et al. | |
| 2011/0222629 A1* | 9/2011 | Lindh et al. | 375/296 |
| 2012/0063401 A1 | 3/2012 | Xue | |

FOREIGN PATENT DOCUMENTS

| | | |
|---|---|---|
| CN | 101034938 A | 9/2007 |
| CN | 101252783 A | 8/2008 |
| CN | 101325798 A | 12/2008 |
| CN | 101448332 A | 6/2009 |
| CN | 101646244 A | 2/2010 |
| CN | 101729455 A | 6/2010 |
| CN | 101925109 A | 12/2012 |
| WO | WO 2008/157692 A2 | 12/2008 |
| WO | 2009041779 A1 | 4/2009 |
| WO | WO 2009/041779 A1 | 4/2009 |
| WO | 2009058905 A1 | 5/2009 |
| WO | 2009116824 A1 | 9/2009 |

OTHER PUBLICATIONS

Catt: DL Control Channel Scheme for LTE-At, 3GPP Draft; Partnership Competence Lucioles ; France, no. Athens, Greece; R1-090938, 3rd Generation Project (3GPP), Mobile Centre ; 650, Route Des F-06921 Sophia-Antipolis Cedex XPO5O318778, Dated Feb. 9-13, 2009, 4 pages total.

Huawei: "PDCCH design for carrier aggregation", 3GPP Draft; R1-090815, 3rd Generation Partnership Project (3GPP), Mobile Competence Centre ; 650, Route Des Lucioles ; F-06921 Sophia-Antipolis Cedex France, no. Athens, Greece; XP050318672, Dated Feb. 9-13, 2009, 5 pages total.

Samsung 3GPP Draft; RI-081212 UE-Specific Spaces, 3rd Generation Partnership (3GPP), Mobile Competence Centre ; Route Des Lucioles ; F-06921 Sophia-Antipolis Cedex ; France, vol. RAN WG1, no. Shenzhen, China; XP050109656, Search Project 650, Dated Mar. 31-Apr. 4, 2008 , 7 pages total.

Samsung: "Compact UL-SCH Assignment in E-UTRA", 3GPP Draft; R1-081217 UL Compact Grant, 3rd Generation Partnership Project (3GPP), Mobile Competence Centre ; 650, Route Des Lucioles ; F-06921 Sophja-Antipolis Cedex France,vol. RAN WG1, no. Shenzhen, China; XP050109661, Dated Mar. 31-Apr. 4, 2008 , 4 pages total.

European Search report issued in corresponding European patent application No. EP10788926.3, Mailed Apr. 12, 2012 , 7 pages total.

First office action issued in corresponding Chinese patent application No. 200910107882.0, Mailed Mar. 23, 2012, and English translation thereof, 9 pages total.

First office action issued in corresponding U.S. Appl. No. 13/325,641, Mailed Feb. 27, 2012, 28 pages total.

Written Opinion of the International Searching Authority issued in corresponding PCT Patent Application No. PCT/CN2010/073936, mailed Sep. 23, 2010.

International Search Report issued in corresponding PCT Patent Application No. PCT/CN2010/073936, mailed Sep. 23, 2010.

Written Opinion of the International Searching Authority issued in corresponding PCT Patent Application No. PCT/CN2010/073921, mailed Sep. 23, 2010.

International Search Report issued in corresponding PCT Patent Application No. PCT/CN2010/073921, mailed Sep. 23, 2010.

Huawei, "LTE-A PDCCH Blind Decoding" 7.1.3. 3GPP TSG RAN WG1 Meeting #60. San Francisco USA, Feb. 22-26, 2010. R1-101048.

CMCC, "Resource Allocation and PDCCH Design Issues in Carrier Aggregation" 12.2. 3GPP TSG-RAN WG1 #55bis. Ljubljana, Slovenia, Jan. 12-16, 2009, R1-090337.

3rd Generation Partnership Project, "Technical Specification Group Radio Access Network; Evolved Universal Terrestrial Radio Access (E-UTRA); Physical Layer Procedures" Release 10. 3GPP TS 36.213, V10.3.0, Sep. 2011.

Office action issued in corresponding Australia application No. 2010262275,dated Jun. 7, 2013,total 5 pages.

Search report issued in corresponding Chinese application No. 201210028291.6,dated Dec. 24, 2012,and an English translation thereof,total 9 pages.

Search report issued in corresponding Chinese application No. 201210028291.6,dated Jun. 5, 2013,total 2 pages.

Office action issued in corresponding European application No. EP10788926.3,dated Jul. 2, 2013,total 4 pages.

Search report issued in corresponding to Chinese application No. 200910107882.0,dated Feb. 28, 2012,and an English translation thereof,total 5 pages.

Office action issued in corresponding Chinese application No. 201210028291.6,dated Feb. 5, 2013,and an English translation thereof, total 8 pages.

* cited by examiner

CONTROL CHANNEL MAPPING METHOD AND APPARATUS

CROSS-REFERENCE TO RELATED APPLICATIONS

This application is a continuation of International Application No. PCT/CN2010/073921, filed on Jun. 13, 2010, which claims priority to Chinese Patent Application No. 200910107882.0, filed on Jun. 16, 2009, both of which are hereby incorporated by reference in their entireties.

FIELD OF THE INVENTION

The present disclosure relates to the field of communication technologies, and in particular, to a control channel mapping technology.

BACKGROUND OF THE INVENTION

In a communication system, in transmission of physical data channels of a User Equipment (UE), the UE needs to be informed through scheduling assignment instructions of the system. A Physical Downlink Control Channel (PDCCH) bears the scheduling assignment instructions, where the scheduling assignment instructions are, for example, a downlink scheduling grant (DL_grant) corresponding to a Physical Downlink Shared Channel (PDSCH) and an uplink scheduling grant (UL_grant) corresponding to a Physical Uplink Share Channel (PUSCH).

In a single-carrier Frequency Division Duplex (FDD) system, data can only be transmitted between the UE and a network side on a pair of uplink and downlink carriers, and the PDCCH may bear the DL_grant and the UL_grant, which are used for instructing the scheduling of downlink and uplink physical data channel resources corresponding to the UE on the carrier pair. However, after the multi-carrier technology is introduced, the data can be transmitted between the UE and the network side on a plurality of carriers or carrier pairs at the same time, and scheduling signaling of a data channel on each carrier is independently coded, so one PDCCH is required to bear the resource scheduling signaling on each carrier.

In a multi-carrier system, for one UE, the PDCCH of the UE is transmitted on each component carrier, for scheduling the transmission of the PDSCH on the component carrier or the PUSCH corresponding to the component carrier. Alternatively, for one UE, all the PDCCHs of the UE is transmitted on one component carrier, that is, the control channel may instruct the transmission of the service channels on the downlink component carrier of the control channel and the corresponding uplink component carrier, and may also instruct the data transmission on different downlink component carriers or on component carriers that are not correspondingly uplink paired.

When all the PDCCHs of one UE are transmitted on one component carrier, as a size of a search space is limited, the impact probability is high, and the PDCCH of the UE may fail to be transmitted, thereby causing that a part of data of the UE fails to be transmitted.

SUMMARY OF THE INVENTION

Embodiments of the present disclosure provide a control channel mapping method, so that an impact probability of control channels is reduced.

An embodiment of the present disclosure further provides a detection method, a network equipment, and a UE.

An embodiment of the present disclosure provides a control channel mapping method, where the method includes:

for a same aggregation level, determining a search space corresponding to each object, where more than one object exist, and the forgoing objects are determined according to a component carrier; and mapping a control channel corresponding to the object into the determined search space.

An embodiment of the present disclosure provides a detection method, where the method includes:

determining an initial location of a search space corresponding to an object, where, for a same aggregation level, more than one search space exist, and the object is determined according to a component carrier;

determining a size of the search space corresponding to the object; and detecting a control channel in the determined search space.

An embodiment of the present disclosure provides a network equipment, where the network equipment includes:

a space module, configured to, for a same aggregation level, determine a search space corresponding to each object, where more than one object exist, and the forgoing objects are determined according to a component carrier; and a mapping module, configured to map a control channel corresponding to the object into the determined search space.

An embodiment of the present disclosure provides a UE, where the UE includes:

a space module, configured to determine an initial location of a search space corresponding to an object, where, for a same aggregation level, more than one search space exist, and the forgoing object is determined according to a component carrier;

a capacity module, configured to determine a size of the search space corresponding to the object; and a detection module, configured to detect a control channel in the determined search space.

It can be seen from the technical solutions that, in the embodiments of the present disclosure, the search space is flexibly configured, so, for a same aggregation level, each object has a corresponding search space, so that the impact probability of control channels corresponding to all objects is reduced, thereby ensuring the transmission of the control channel of the UE, and further ensuring successful data transmission of each UE.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the objectives, technical solutions, and advantages of the present disclosure more comprehensible, the present disclosure is described in further detail in the following with reference to embodiments and the accompanying drawings. It is obvious that the described embodiments are only a part rather than all of the embodiments of the present disclosure. All other embodiments obtained by persons skilled in the art based on the embodiments of the present disclosure without creative efforts shall fall within the protection scope of the present disclosure.

In the following embodiments of the present disclosure, a Long Term Evolution-Advanced (LTE-A) system is taken as an example for description, but the present disclosure is not limited to the LTE-A system, and is also applicable to other systems, such as a Wideband Code Division Multiple Access (WCDMA) system, or an LTE system.

Figure 1:
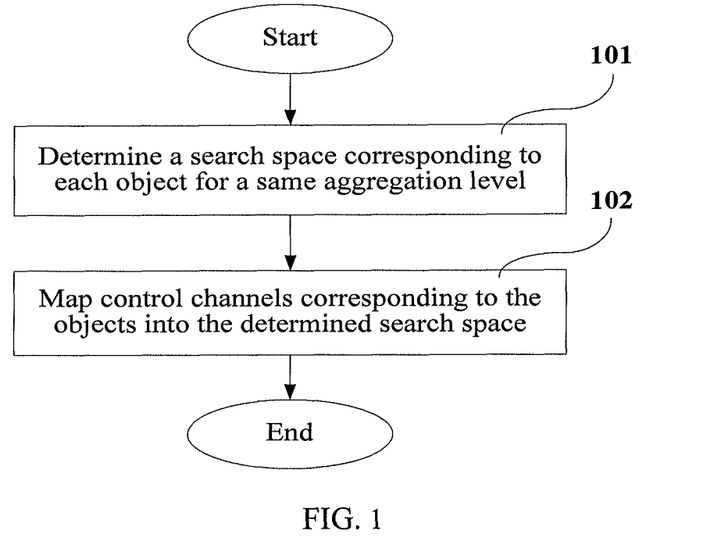
FIG. 1 is a schematic flow chart of a control channel mapping method according to an embodiment of the present disclosure.

An embodiment of the present disclosure is described in detail in the following with reference to FIG. 1. This embodiment provides a control channel mapping method, where the method includes:

Step 101: For a same aggregation level, a search space corresponding to each object is determined, where more than one object exist, and the objects are determined according to a component carrier.

Step 102: Control channels corresponding to the objects are mapped into the determined search space.

In this embodiment, the number of the objects is larger than one, and for a same aggregation level, each object has a corresponding search space of its own, so a plurality of search spaces exists for the same aggregation level. A network side maps the control channels corresponding to the objects into the determined search space, so a UE may detect the control channel of the UE in the determined search space. Since, for the same aggregation level, each object has a corresponding search space of its own, more control channels may be accommodated, that is, the control channels required for scheduling more carriers by the UE may be accommodated. The method provided in this embodiment effectively reduces an impact probability of control channels, so the UE data may be successfully scheduled and transmitted according to the service requirements.

In this embodiment, after step 102, the method further includes: transmitting the control channels which are mapped into the search space.

Further, in this embodiment, the control channel may be, for example, a PDCCH. In this embodiment and the following embodiments, the PDCCH is taken as an example for illustration, but the present disclosure is not limited to the PDCCH.

Further, in this embodiment, the object may be, for example, determined by the component carrier. When the object is determined according to the component carrier, the object may be the component carrier, or a component carrier pair, or a component carrier set, that is, one object is one component carrier, or one component carrier pair, or one component carrier set.

In this embodiment, for example, in the case of many component carriers, in order to reduce the number of search spaces and the detection complexity of the UE, the component carriers or component carrier pairs may be grouped, and each group is a component carrier set. At this time, the object is the component carrier set. In this embodiment and the following embodiments, the method of grouping the component carriers and component carrier pairs is not limited. For example, when unpaired component carriers exist, the unpaired component carriers may be independently grouped, or the unpaired component carriers and other component carriers may be grouped into one group. The grouping of the component carriers facilitates the saving of the corresponding search space and the reducing of the number of times of blind detection. The forgoing grouping method may be, for example, informed by the network side to the UE through signaling, and may also be obtained by the network side and the UE by using a same algorithm, and may also be preset in the network side and the UE. For the convenience of description, in this embodiment and the following embodiments, the case that the object is the component carrier is taken as an example for illustration, and the embodiment in which the component carrier is taken as an example for description is also applicable to the component carrier pair and the component carrier set.

Further, in this embodiment, for each aggregation level, the location relation between the determined search spaces corresponding to the objects may be discontinuous or continuous, and may be completely non-overlapped, partially overlapped or completely overlapped. In this embodiment and the following embodiments, when the search spaces are completely overlapped, the search spaces are considered to be two different search spaces, that is, two different search spaces are completely overlapped. The location relation between the search spaces may affect the impact condition of the PDCCHs or the number of times of blind detection performed by the UE. The determined all kinds of search spaces are described in detail in the following.

In this embodiment, the determining the search space may include, for example, determining an initial location of the search space and determining a size of the search space. Since time frequency resources allocated to the PDCCH may be divided into a plurality of Control Channel Elements (CCE), and the CCE is the smallest unit for constituting the PDCCH, the determining the size of the search space may be determining the number of the CCEs included in the search space. Likewise, the determining the initial location of the search space may be, for example, determining the serial number of the initial CCE in the search space. Since the CCE serial numbers in one search space are continuous, the serial numbers of all the CCEs included in the search space may be known according to the serial number of the initial CCE in the determined search space and the included number of the CCEs.

In order to ensure that, for the same aggregation level, different objects have different search spaces, the search space needs to be determined according to the aggregation level and an object feature parameter. That is to say, the search space for each aggregation level is determined according to the object feature parameter. The object feature parameter is a different parameter obtained based on a different object, and when the object is the component carrier, the object feature parameter is the component carrier feature parameter. For example, the component carrier feature parameter may be a UE identifier, that is, a UE ID, and a component carrier indicator. In addition, the object feature parameter may also be another different parameter obtained based on a different object.

In this embodiment, the serial number of the initial CCE of the search space may be determined, for example, according to the UE ID. Since the same UE may have different UE IDs on different component carriers, the initial location of the search space may be calculated by using the UE ID, and the initial locations of the search space on different component carriers may be different at the same aggregation level. The initial location of the search space of the control channel of one UE in a subframe k by using the UE ID may be calculated, for example, according to the following two formulas: $Y_k=(A*Y_{k-1}) \mod D$ and $Z_k(L)=L*[Y_k \mod \lfloor N_{CCE,k}/L \rfloor]$, where, $Y_{-1}$ is an iteration initial value, that is, the UE ID, A, may be, for example, 39827, D may be, for example, 65537, L is the aggregation level, and $N_{CCE,k}$ is the total number of the CCEs for controlling the channel transmission in the subframe k.

In comparison with the prior art, since different component carriers correspond to the same search space for the same UE and the same aggregation level, the problem that the search space is limited and an impact probability of control channels is too high may exist. For example, four aggregation levels exist in the prior art, which are respectively, aggregation of one, two, four, and eight CCEs. Corresponding to the aggregation level with four-CCE aggregation, the size of the search space is set to be eight CCEs, and the number of the control channels bearable in the search space is 2 (8/4), that is, the initial locations of the search spaces of the PDCCHs corresponding to different carriers of the same UE are all the same and the sizes of the search spaces are also the same for the aggregation level with four CCEs. For example, the serial number of the initial CCE of the search space is eight, and the size of the search spaces includes eight CCEs, so the serial number of an end CCE is 15. When the number of the control channels corresponding to all the component carriers scheduled for one UE is larger than 2, the PDCCHs cannot be prevented from impacts. Even if the number of the control channels corresponding to the component carriers is smaller than two, since the search spaces are limited and the search spaces between the users may be overlapped, the impact of the PDCCHs corresponding to different UE is also difficult to be avoided.

In this embodiment, when the UE ID of the same UE on each component carrier is different, the calculation of the initial location of the search space by using the UE ID may enable the initial locations of the search spaces corresponding to different component carriers to be relatively random, thereby reducing the impact probability of the initial locations of the search spaces. Each component carrier may correspond to the search space of the component carrier itself, thereby avoiding the impact of the PDCCHs corresponding to different component carriers, and reducing the conflict of the PDCCHs.

In this embodiment, the initial location of the search space may also be determined, for example, according to the component carrier indicator. Since the component carrier indicators of different component carriers are different, the initial locations of the search spaces determined according to the component carrier indicators are different. The present disclosure does not limit the specific method for determining the search space according to the component carrier indicator, and for details about the implementation, reference may be made to the method for determining the initial location of the search space according to the UE ID.

In this embodiment, since the feature parameters of different objects are different, the determining the initial location of the search space according to the feature parameter may enable the initial locations of the search spaces of different objects to be different for the same aggregation level.

Further, since the number of all the CCEs allocated to the control channels may be involved when the initial location of the search space is determined according to the feature parameter, in this embodiment, all the CCEs allocated to the control channels may be further divided, that is, space division, so as to further determine the initial location of the search space. For example, the number of all the CCEs allocated to the control channels is 100, and when the calculation is performed by using the feature parameter, in order to prevent the calculation result from exceeding the 100 CCEs, the calculation result may be limited to the 100 CCEs, for example, the modulus of 100 is taken for the calculation result. In this way, the initial locations, obtained through the calculation according to different feature parameters, of the search spaces may be the same. In order to further avoid the impact of the control channels, all the CCEs may be divided into two groups, that is, the whole space allocated to the control channel is divided into two spaces. In this way, a part of the search space may be limited to be located in the first space obtained through the division, and other search spaces are merely located in the second space obtained through the division. In order to better avoid the impact of the control channels, the space may be divided according to the number of the objects. For example, the whole space allocated to the control channel is divided into N spaces in the case of N objects, and the search space of each object may only be located in the corresponding space obtained through the division.

In this embodiment, the initial location of the search space corresponding to each object may also be determined according to the serial number of the subframe. As the serial number of the subframe is not a feature parameter of the object, the serial number of the same subframe is the same for each object, and the initial locations of the search spaces corresponding to different objects determined according to the serial numbers of the subframes are the same. Therefore, a size of a specific search space needs to be further determined, and the size of the specific search space may be different from a size of a standard search space. The size of the standard search space may be, for example, a size of a search space set for each aggregation level in an existing communication system.

In this embodiment, the initial location of the search space corresponding to each object may also be determined according to the aggregation level. Since the aggregation level is not the feature parameter of the object, the initial locations of the search spaces corresponding to different objects determined according to the aggregation levels are the same. Therefore, the size of the specific search space needs to be further determined, and the size of the specific search space may be different from the size of the standard search space. When the initial location of the search space is determined for each aggregation level, the aggregation level may still be used as a determination basis, that is, the initial location of the search space corresponding to the object of the aggregation level is determined according to the aggregation level.

In this embodiment, the initial location of the search space corresponding to the object may be determined according to the aggregation level, the serial number of the subframe, the feature parameter or the space division respectively, and may also be determined according to a random combination of the foregoing various factors. Meanwhile, after the initial location of the search space is determined, the size of the search space may be further determined or may be no longer determined, and merely the size of the standard search space is used.

Further, in this embodiment, when the initial locations of the search spaces corresponding to two objects for the same aggregation level are the same, the size of the search space may be same and may also be different. When the initial locations of the search spaces corresponding to two objects are the same and the sizes of the search spaces are also the same, the sizes of the search spaces may be made to be larger than that of the standard search space. For example, when the aggregation level includes eight CCEs, and the standard search space includes 16 CCEs, in order to reduce the collision of the control channels, the sizes of the search spaces corresponding to the objects may be made to be larger than 16 CCEs, which, for example, includes 32 CCEs. In this way, for the same aggregation level, even if the search spaces corresponding to different objects are completely overlapped, the objective of reducing the collision of the control channels may be achieved by increasing the sizes of the search spaces.

Further, in this embodiment, for the same aggregation level, when the initial locations of the search spaces corresponding to different objects are different, the sizes of the search spaces may be the same and may also be different. Moreover, the sizes of the search spaces may be larger than, equal to or smaller than that of the standard search space according to the practical application requirements.

Through this embodiment, when, for the same aggregation level, the search spaces corresponding to different objects are completely non-overlapped, object identifier information such as a carrier index may be no longer transmitted. This is because that: since the search spaces of different objects are completely non-overlapped for the same aggregation level, when the UE detects the PDCCH in a specific search space, the UE may know that the PDCCH corresponds to the object corresponding to the search space. When, for the same aggregation level, the search spaces corresponding to different objects are partially overlapped or completely overlapped, the object identifier information needs to be transmitted, so the UE may know which object the PDCCH detected by the UE in a certain search space corresponds to.

In this embodiment, a main object may be preferentially scheduled, and the PDCCH corresponding to the main object is mapped into the search space corresponding to the main object. When the object is the component carrier, the main object is preferentially scheduled, that is, the network side preferentially schedules the main carrier for data transmission. The corresponding UE may preferentially detect the search space corresponding to the main object, where the main object is determined according to the main carrier. For example, when the main object is determined according to the main carrier, the main object is, for example, a main carrier, a main carrier pair or a main carrier set. In this embodiment, the network side may preferentially schedule the main carrier for data transmission, and if the main carrier is not scheduled for data transmission, other component carriers are also not scheduled for data transmission. Correspondingly, if the UE fails to detect the PDCCH in the search space corresponding to the main object, the search space corresponding to a non-main object is no longer detected, and it is considered that the PDCCH of the UE does not exist in the search space corresponding to the non-main object. If the PDCCH is detected in the search space corresponding to the main object, the search space corresponding to the non-main object is continuous to be detected.

In this embodiment, a plurality of methods may be used to distinguish a main object from a non-main object, which does not limit the present disclosure. For example, the component carrier most frequently detected by the UE may be used as the main carrier, or the component carrier set with the PDCCH is used as the main carrier, or the component carrier with the best channel condition is used as the main carrier.

Further, in this embodiment, since the public search space is the search space requiring detection by all the UEs requiring detection of control channels, the PDCCH channel may be preferentially mapped into the public search space, thereby further reducing the number of times of blind detection. If the public search space is insufficient, the main object may be preferentially scheduled, and the control channel of the main object is mapped into the search space corresponding to the main object.

Further, in this embodiment, priorities of the objects may be further distinguished, that is, preferentially scheduling an object with high priority, and the PDCCH corresponding to the object with a high priority is mapped into the search space corresponding to the object with a high priority. That is to say, in this embodiment, not only the main object and the non-main object are divided, but also more priorities may be divided.

Further, in this embodiment, the distribution of the search spaces has no specific restriction, that is, the search spaces may all be set on the main carrier, or the search spaces may be preferentially set on the main carrier. Since the channel condition of the main carrier is better, and the user in a connection state is required to frequently detect the main carrier, all the search spaces being set on the main carrier facilitates the improving of a transmission performance of the UE control channel. In addition, the search spaces may also be set on other component carriers. When the search spaces are set on component carriers other than the main carrier, in order to obtain a better transmission performance of the control channel, the search spaces may be preferentially set on the main carrier, and especially, the search space corresponding to the main object may be preferentially set on the main carrier. For example, in the case of multiple objects, if the space allocated to the control channel by the main carrier is insufficient to hold all the search spaces, a part of the search spaces may be set on other component carriers. For example, the search spaces corresponding to the main carrier are set on the main carrier, or the search spaces corresponding to a PDCCH format with a high appearance probability are set on the main carrier.

Further, in this embodiment, the network side may also inform, through signaling, the UE of the determined search space. For example, the method for determining the search space, or the parameters used for determining the search space or the determined initial location and/or size is informed to the UE.

Through this embodiment, for the same aggregation level, the corresponding search spaces may be determined for different objects, and since the determined search space merely corresponds to the object, an impact probability of control channels corresponding to different objects may be reduced, thereby reducing the collision of control channels. Meanwhile, in view of the number of times of blind detection, the search spaces may be made to be partially overlapped or completely overlapped, so the number of times of blind detection may be reduced. Further, in view of a signaling overhead, the search spaces may be made to be completely non-overlapped, so different objects are implicitly informed, and it is not required to indicate which object is specifically found in a certain search space, thereby saving the signaling overhead. Therefore, the solution of determining the search space may be flexibly used according to requirements of practical conditions.

Figure 2:
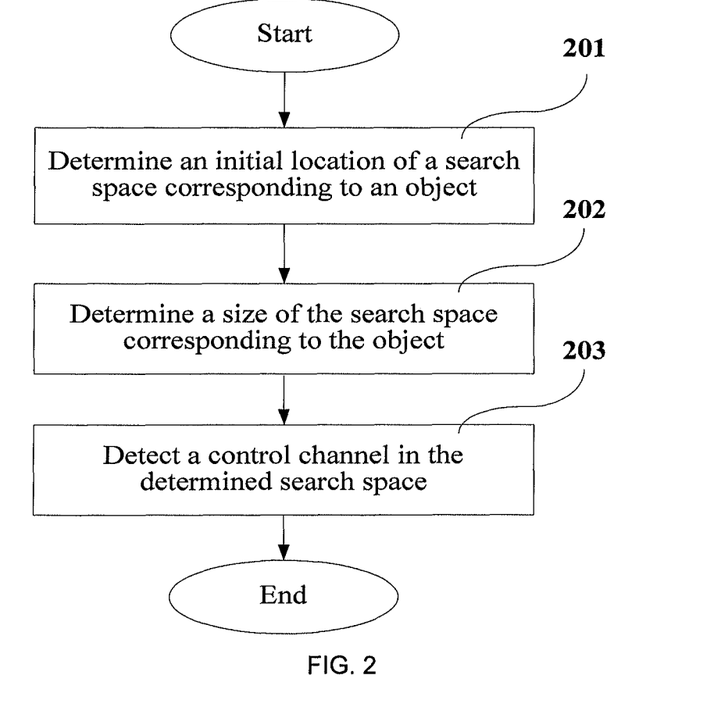
FIG. 2 is a schematic flow chart of a detection method according to an embodiment of the present disclosure.

Another embodiment of the present disclosure is described in detail in the following with reference to FIG. 2. This embodiment provides a detection method, and the detection method may be applied corresponding to the solution for determining the search space provided in the previous embodiment, where the method includes:

Step 201: An initial location of a search space corresponding to an object is determined, where more than one search space exist for the same aggregation level, and the forgoing object is determined according to a component carrier.

Step 202: A size of the search space corresponding to the object is determined.

Step 203: A control channel is detected in the determined search space.

Through this embodiment, for a plurality of search spaces for the same aggregation level, a UE may determine the search space corresponding to each object, so as to detect a PDCCH corresponding to the object in the search space. Since different objects correspond to different search spaces for the same aggregation level, collision of the control channels may be reduced, and impacts of the control channels are avoided as much as possible.

In this embodiment, the UE may also determine the initial location of the search space corresponding to the object, for example, according to a feature parameter of the object. For the feature parameter of an object, reference may be made to the previous embodiment. Since the feature parameters of different objects are different, the initial locations of the search spaces obtained through the calculation according to the feature parameters of the objects by the UE are different. For implementation of the determining, by the UE, the initial location of the search space according to the feature parameter, reference may be made to the previous embodiment.

In this embodiment, the initial location of the search space corresponding to the object may also be determined, for example, according to an aggregation level and/or serial numbers of a subframe. Since the aggregation level and the serial number of the subframe are not the feature parameter of the object, for the same aggregation level, the initial locations of the search spaces corresponding to different objects determined according to the aggregation level and/or the serial number of the subframe are the same.

In this embodiment, the UE may also determine the initial location of the search space corresponding to the object, for example, according to space division. For example, if the whole space allocated to the control channel is divided into N spaces, the UE determines the initial location of the search space in each space, and for the specific implementation method, reference may be made to the previous embodiment.

In this embodiment, the UE may also determine the initial location of the search space corresponding to the object, for example, according to a signaling notice of a network side. In this embodiment, the initial location of the search space corresponding to the object may be determined according to one of the foregoing various methods or a random combination thereof. For example, the initial location of the search space may be determined according to the feature parameter and the aggregation level.

In this embodiment, the UE determines the size of the search space corresponding to the object, for example, according to the aggregation level by the UE. For example, in the case that the aggregation level includes 1 CCE, the size of the standard search space includes 6 CCEs; in the case that the aggregation level includes 2 CCEs, the size of the standard search space includes 12 CCEs; in the case that the aggregation level includes 4 CCEs, the size of the standard search space includes 8 CCEs; and in the case that the aggregation level includes 8 CCEs, the size of the standard search space includes 16 CCEs. In this embodiment, the size of the corresponding search space is determined according to the aggregation level, the size of the standard search space, or a standard known to the network side and the UE. For example, the network side and the UE both know that, in the case that the aggregation level includes 1 CCE, the size of the search space includes 8 CCEs.

In this embodiment, the UE may also determine the size of the search space corresponding to the object, for example, according to the initial location of the search space corresponding to the object. When the size of the search space is determined according to the initial location of the search space corresponding to the object, it may be that, for example, the sizes of the search spaces may be different when the initial locations of the search spaces corresponding to different objects are the same, or the sizes of the search spaces may be the same and larger than that of the standard space. When the size of the search space is determined according to the initial location of the search space, it may be that, for example, the sizes of the search spaces may also be the same when the initial locations of the search spaces corresponding to different objects are different, or the sizes of the search spaces may also be equal to or smaller than that of a space between the initial location of the search space and an initial location of an adjacent search space when the initial locations of the search spaces are different.

In this embodiment, the UE may also determine the size of the search space corresponding to the object according to a resource state of the control channel or the number of the control channels required to be mapped in the search space.

In this embodiment, the UE may also determine the size of the search space corresponding to the object, for example, according to the signaling notice of the network side.

In this embodiment, the UE may also determine the size of the search space corresponding to the object according to one of the previous methods or a random combination thereof. For example, the UE determines the size of the search space according to the aggregation level and the initial location of the search space.

In this embodiment, during the detection of the control channel, the UE may preferentially detect the search space corresponding to the main object. When no control channel is detected in the search space corresponding to the main object, the search space corresponding to the non-main object is no longer detected, and only when the control channel is detected in the search space corresponding to the main object, the search space corresponding to the non-main object is continues to be detected.

Further, in this embodiment, the search space corresponding to the object with the highest priority may be preferentially detected, and after the PDCCH is detected, the search space corresponding to the object with a lower priority is detected, and the search spaces corresponding to the objects with other priorities are detected in a similar way.

Through this embodiment, for the same aggregation level, the UE may determine the search space corresponding to each object in a plurality of search spaces and detect the control channel in the space. Therefore, the network side is supported to reduce collision of the control channels. In addition, the solution that the UE preferentially detects the control channel corresponding to the main object facilitates to reduce the number of times of blind detection.

Figure 3:
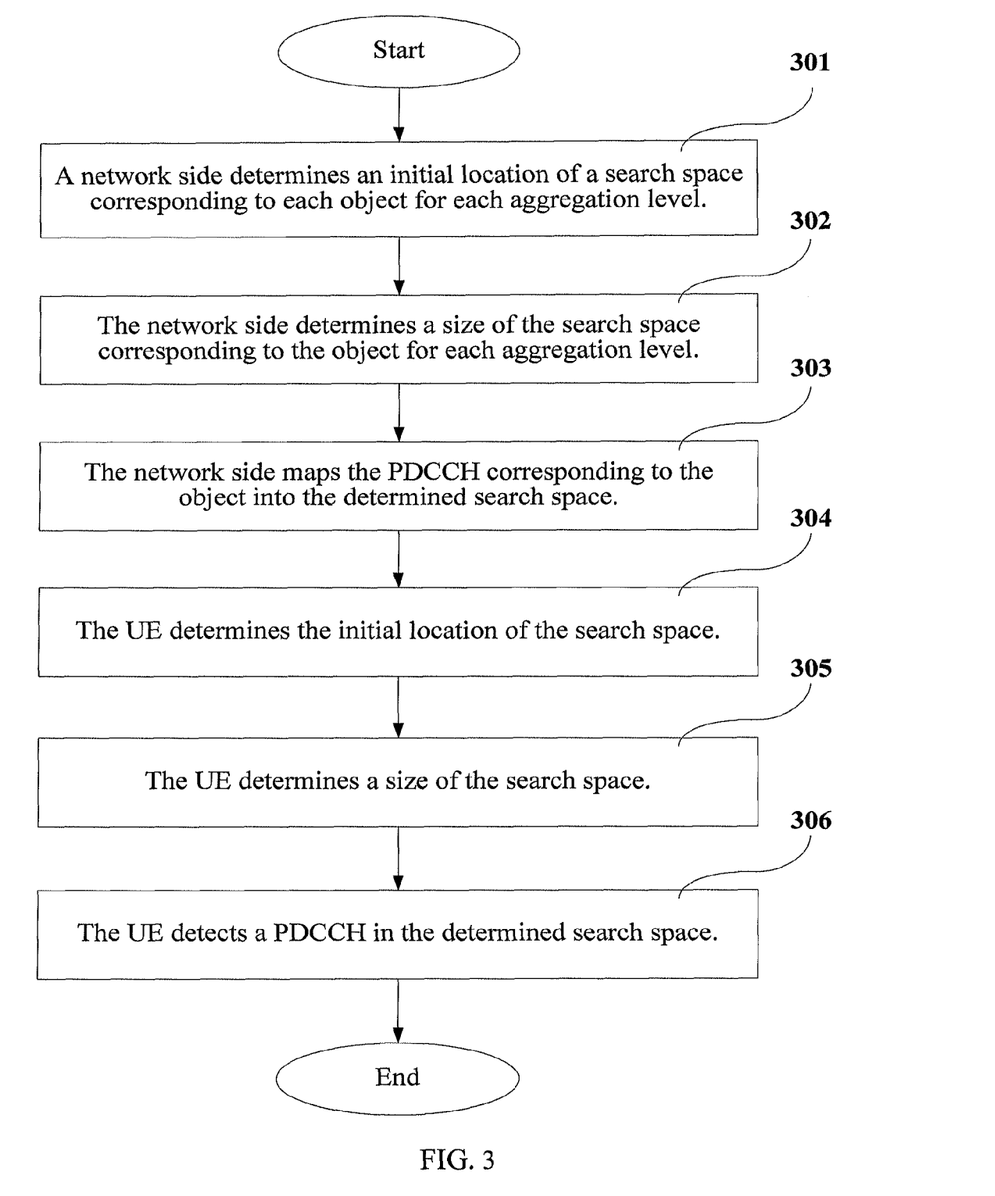
FIG. 3 is a schematic flow chart of a control channel mapping method according to an embodiment of the present disclosure.

Still another embodiment of the present disclosure is described in detail in the following with reference to FIG. 3. In this embodiment, an object is, for example, a component carrier pair, and the detailed illustration is as follows.

Step 301: A network side determines an initial location of a search space corresponding to each object for each aggregation level.

The network side schedules 3 component carrier pairs to transmit data for a UE1, where the three component carrier pairs are respectively a component carrier pair A, a component carrier pair B, and a component carrier pair C, and the component carrier pair B is a main carrier pair.

An UE ID of the UE1 on each component carrier pair is different. The UE ID of the UE1 is UE ID1 for the component carrier pair A, the UE ID of the UE1 is UE ID2 for the component carrier pair B, and the UE ID of the UE1 is UE ID 3 for the component carrier pair C.

For each aggregation level, the network side determines the initial location of the search space corresponding to each component carrier pair of the UE1 according to the UE ID of the UE1 and the aggregation level. For the specific method, reference may be made to the formulas in the embodiment illustrated in FIG. 1.

For example, it can be obtained according to the formulas that, in the case that the aggregation level includes two CCEs, the initial location of the search space corresponding to the component carrier pair A is on the CCE with the serial number 4 on a downlink carrier of the main carrier pair, the initial location of the search space corresponding to the main carrier pair is on the CCE with the serial number 32 on the downlink carrier of the main carrier pair, and the initial location of the search space corresponding to the component carrier pair C is on the CCE with the serial number 8 on the downlink carrier of the component carrier pair A.

As can be seen, the search spaces corresponding to the main carrier pair are preferentially set on the main carrier pair, while the search spaces may also be set on the component carrier pair A. In this embodiment, only the case in which the search spaces corresponding to the component carrier pair C are set on the component carrier pair A is taken as an example, and the search spaces may also be set on the component carrier pair C in other applications.

Sep 302: For each aggregation level, the network side determines a size of the search space corresponding to the object.

For the UE1, PDCCH formats corresponding to the component carrier pair A are a format 1 and a format 2, the PDCCH formats corresponding to the component carrier pair B are a format 2 and a format 3, and PDCCH formats corresponding to the component carrier pair C are a format 4, a format 5, and a format 6.

Since the three component carriers correspond to different PDCCH formats, the completely non-overlapped search spaces may be adopted. In this embodiment, the network side adopts the size of the standard search space, so the size of the search space includes 12 CCEs in the case that the aggregation level includes 2 CCEs, and the size of the search space may enable, for the same aggregation level, the search spaces corresponding to the three component carrier pairs to be completely non-overlapped.

Since the serial numbers of the CCEs in each search space are continuous, it can be determined that, in the case that the aggregation level includes 2 CCEs, the serial numbers of the CCEs included in the search space corresponding to the component carrier pair A are 4, 5, 6, 7, . . . , 14, and 15, the serial numbers of the CCEs included in the search space corresponding to the component carrier pair B are 32, 33, 34, 35, . . . , 42, and 43, and the serial numbers of the CCEs included in the search space corresponding to the component carrier pair C are 8, 9, 10, 11, . . . , 18, and 19. It can be seen from the serial numbers of the included CCEs that, the serial numbers of the CCEs included in the search space corresponding to the component carrier pair A and the serial numbers of the CCEs included in the search space corresponding to the component carrier pair C are partially overlapped, but such two search spaces are not overlapped as the search space corresponding to the component carrier pair A is set on the main carrier while the search space corresponding to the component carrier pair C is set on the component carrier pair C.

Since the search spaces of different component carrier pairs are completely non-overlapped, identifier information of the component carrier pair may not be transmitted, such as an index of the component carrier pair. In this embodiment, the UE may judge which component carrier pair the PDCCH corresponds to by detecting the PDCCH in different search spaces, that is, the network side implicitly informs the UE of the index of the carrier pair.

Steps 301 and 302 are not necessarily performed in sequence, and either of steps 301 and 302 may be performed first.

Step 303: The network side maps the PDCCH corresponding to the object into the determined search space.

The search space of the UE1 with the aggregation level including two CCEs is determined in steps 301 and 302. When the network side performs the scheduling on data transmission, the main carrier is preferentially scheduled for data transmission, and in this way, the PDCCH is preferentially mapped in the search space corresponding to the main carrier pair.

When the main carrier pair transmits no data of the UE1, the component carrier pair A and the component carrier pair C also transmit no data of the UE1.

Step 304: The UE determines an initial location of the search space.

The UE1 calculates the initial locations of the search spaces corresponding to different component carrier pairs of the UE1 for each aggregation level according to different, on different component carrier pairs UE IDs, of UE1 component carrier.

For example, for UE1, it can be determined according to the UE ID1, UE ID2, and UE ID3 that, in the case that the aggregation level includes 2 CCEs, the initial location of the search space corresponding to the component carrier pair A is on the CCE with the serial number 4 on a downlink carrier of the main carrier pair, the initial location of the search space corresponding to the main carrier pair is on the CCE with the serial number 32 on the downlink carrier of the main carrier pair, and the initial location of the search space corresponding to the component carrier pair C is on the CCE with the serial number 8 on the downlink carrier of the component carrier pair A.

Step 305: The UE determines a size of the search space.

The UE1 determines the size of the standard search space used by the network side, and the size of the standard search space includes 12 CCEs in the case that the aggregation level includes 2 CCEs.

Therefore, in the case that the aggregation level includes 2 C CEs, the serial numbers of the CCEs included in the search space corresponding to the component carrier pair A are 4, 5, 6, 7, . . . , 14, and 15, the serial numbers of the CCEs included in the search space corresponding to the component carrier pair B are 32, 33, 34, 35, . . . , 42, and 43, and the serial numbers of the CCEs included in the search space corresponding to the component carrier pair C are 8, 9, 10, 11, . . . , 18, and 19.

Step 306: The UE detects the PDCCH in the determined search space.

The UE preferentially detects the PDCCH in the search space corresponding to the main carrier pair, that is, the UE detects the PDCCH channel in the CCEs with the serial numbers from 32 to 43 on the downlink carrier of the main carrier pair. When the UE fails to detect the PDCCH in the search space corresponding to the main carrier pair, the search spaces corresponding to the component carrier pairs A and C are no longer detected. When the UE detects the PDCCH in the search space corresponding to the main carrier pair, the search spaces corresponding to the component carrier pairs A and C are further detected.

In this embodiment, the network side may reduce the collision of the PDCCH by determining one search space for each object for the same aggregation level, and the UE may determine the search space corresponding to each object for the same aggregation level and detect the PDCCH in the search space. In addition, the UE is implicitly informed of the identifier information of each object through the case of completely non-overlapped search space, so that a signaling overhead is reduced. In addition, the number of times of blind detection of the UE may be further reduced by setting a priority.

Figure 4:
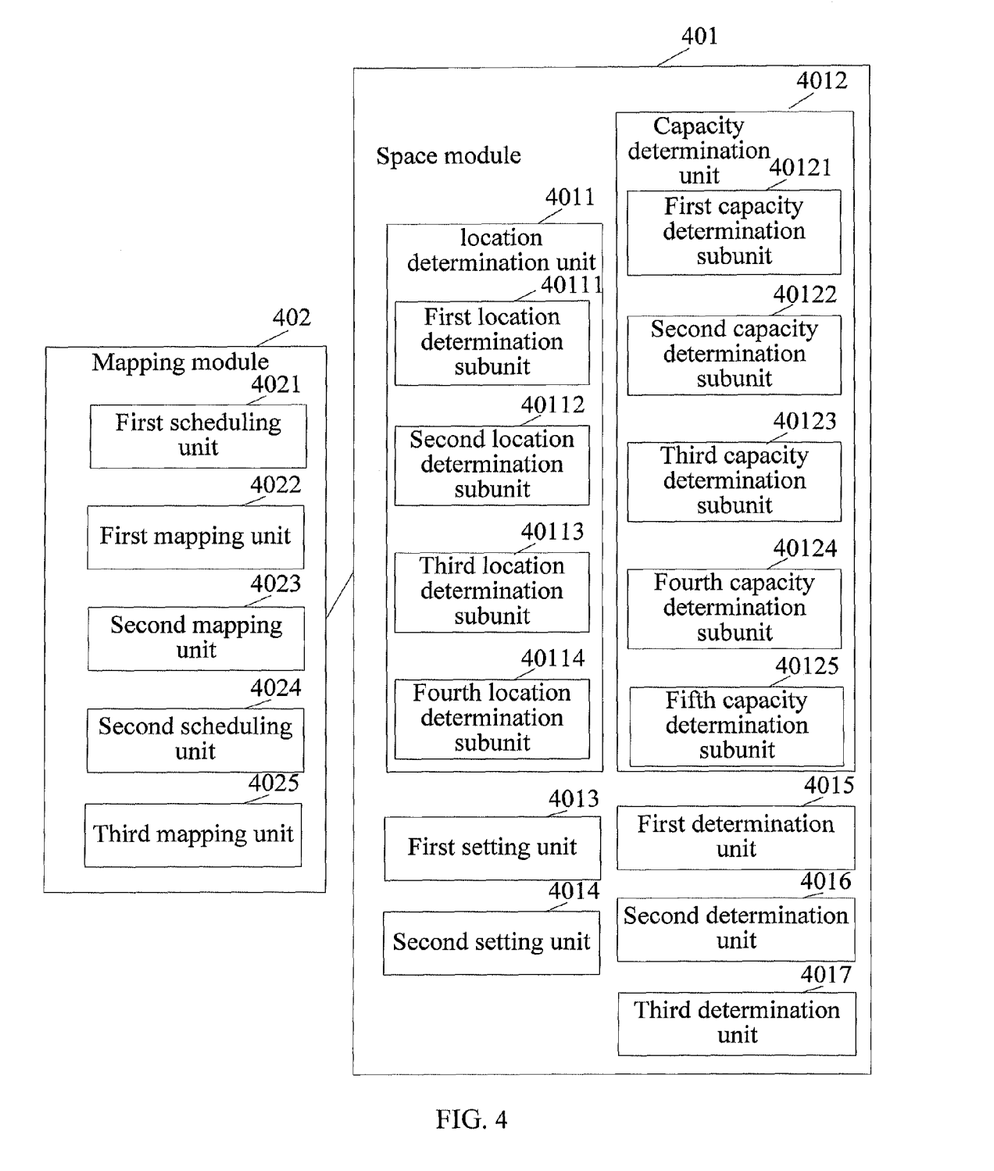
FIG. 4 is a schematic structural view of a network equipment according to an embodiment of the present disclosure.

Still another embodiment of the present disclosure is described in detail in the following with reference to FIG. 4. This embodiment provides a network equipment, where the network equipment is, for example, a base station, a Femtocell or other functional entities having the same function, and for the specific operation method of the network equipment, reference may be made to the embodiment illustrated in FIGS. 1 and 3. The network equipment includes a space module 401 and a mapping module 402.

The space module 401 is configured to, for a same aggregation level, determine a search space corresponding to each object, where more than one object exist and the forgoing objects are determined according to a component carrier.

The mapping module 402 is configured to map control channels corresponding to the objects into the search space determined by the space module 401.

The network equipment provided in this embodiment may, for the same aggregation level, determine different search spaces for different objects, so each object has a corresponding search space, thereby reducing the collision of the control channels and an impact probability of control channels.

Further, in this embodiment, the space module 401 may also include a location determination unit 4011, configured to, for the same aggregation level, determine an initial location of the search space corresponding to each object, and/or a capacity determination unit 4012, configured to, for the same aggregation level, determine the size of the search space corresponding to each object.

Further, in this embodiment, the location determination unit 4011 may further include one of following subunits or a random combination thereof: a first location determination subunit 40111, configured to determine the initial locations of the search spaces corresponding to the objects according to a feature parameter of each object; a second location determination subunit 40112, configured to determine the initial location of the search space corresponding to each object according to a serial number of a subframe; a third location determination subunit 40113, configured to determine the initial location of the search space corresponding to each object according to space division; and a fourth location determination subunit 40114, configured to determine the initial location of the search space corresponding to each object according to an aggregation level. In this embodiment, the network equipment may determine the initial location of the search space through one of the first location determination subunit 40111, the second location determination subunit 40112, the third location determination subunit 40113, and the fourth location determination subunit 40114, and may also determine the initial location of the search space through a combination of the subunits. For example, the initial location of the search space is determined by the third location determination subunit 40113 and the first location determination subunit 40113 together, that is, the initial location of the search space is determined according to the feature parameter of the object and the space division at the same time.

Further, in this embodiment, the capacity determination unit 4012 may further include one of following subunits or a random combination thereof: a first capacity determination subunit 40121, configured to, for the same aggregation level, determine that the sizes of the search spaces corresponding to at least two objects are different when the initial locations of the search spaces corresponding to the at least two objects are the same; a second capacity determination subunit 40122, configured to, for the same aggregation level, determine that the sizes of the search spaces corresponding to at least two objects are the same and larger than that of the standard search space when the initial locations of the search spaces corresponding to the at least two objects are the same; a third capacity determination subunit 40123, configured to determine that the size of the search space corresponding to the object is equal to or smaller than that of a space between the initial location of the search space corresponding to the object and an initial location of an adjacent search space; a fourth capacity determination subunit 40124, configured to determine the size of the search space corresponding to the object according to a resource state of the control channel or the number of the control channels required to be mapped in the search space; and a fifth capacity determination subunit 40125, configured to determine that the sizes of the search spaces corresponding to at least two objects are the same when the initial locations of the search spaces corresponding to the at least two objects are different for the same aggregation level.

Further, in this embodiment, the mapping module 402 may include: a first scheduling unit 4021, configured to preferentially schedule the main object, where the main object is determined according to the main carrier; and a first mapping unit 4022, configured to map the control channel corresponding to the main object into the search space corresponding to the main object. The mapping module 402 may include, for example: a second mapping unit 4023, configured to preferentially map the control channel corresponding to the object into a public search space; a second scheduling unit 4024, configured to preferentially schedule the main object when the public search space is insufficient; and a third mapping unit 4025, configured to map the control channel corresponding to the main object into the search space corresponding to the main object.

Further, in this embodiment, the space module 401 may further include: a first setting unit 4013, configured to set all the search spaces on the main carrier; or a second setting unit 4014, configured to preferentially set the search spaces on the main carrier.

Through the network equipment in this embodiment, different search spaces may be set for different objects for the same aggregation level, so each object corresponds to its own search space, thereby reducing the collision of the control channels. Moreover, the network equipment may preferentially schedule the main object, so that the UE may preferentially detect the search space corresponding to the main object, thereby reducing the number of the blind detection.

Figure 5:
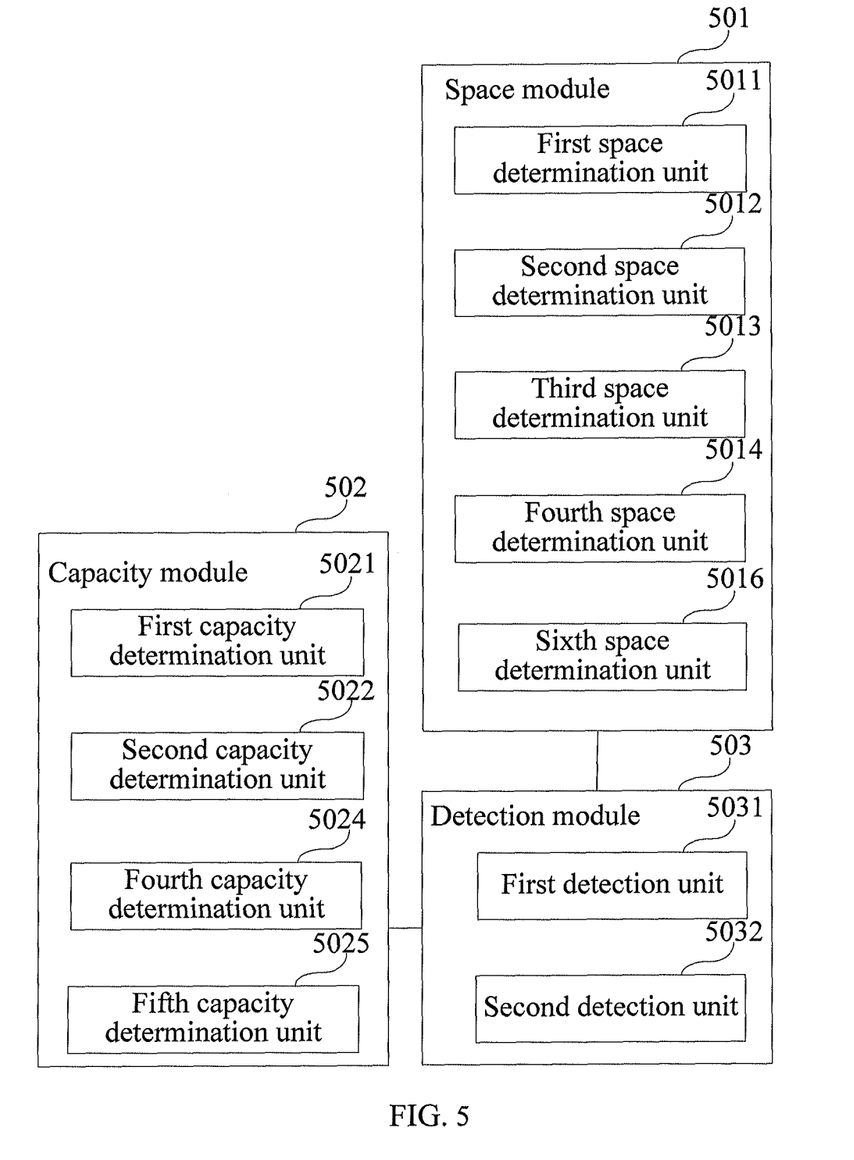
FIG. 5 is a schematic structural view of a UE according to an embodiment of the present disclosure.

Still another embodiment of the present disclosure is described in detail in the following with reference to FIG. 5. This embodiment provides a UE, where the UE includes: a space module 501, configured to determine an initial location of a search space corresponding to an object, where more than one search space exist and the object is determined according to a component carrier for the same aggregation level; a capacity module 502, configured to determine the size of the search space corresponding to the object; and a detection module 503, configured to detect a control channel in the determined search space.

Through the UE provided in this embodiment, the search space corresponding to each object may be determined for the same aggregation level, and the control channel is detected in the search space.

Further, in this embodiment, the space module 501 may include one of the following units or a random combination thereof: a first space determination unit 5011, configured to determine the initial location of the search space corresponding to the object according to a feature parameter of the object; a second space determination unit 5012, configured to determine the initial location of the search space corresponding to the object according to an aggregation level; a third space determination unit 5013, configured to determine the initial location of the search space corresponding to the object according to a serial number of a subframe; a fourth space determination unit 5014, configured to determine the initial location of the search space corresponding to the object according to space division; and a sixth space determination unit 5016, configured to determine the initial location of the search space corresponding to the object according to a signaling notice of a network side.

Further, in this embodiment, the capacity module 502 may include one of the following units or a random combination thereof: a first capacity determination unit 5021, configured to determine a size of the search space corresponding to the object according to the aggregation level; a second capacity determination unit 5022, configured to determine the size of the search space corresponding to the object according to the initial location of the search space corresponding to the object; a fourth capacity determination unit 5024, configured to determine the size of the search space corresponding to the object according to a resource state of the control channel or the number of the control channels required to be mapped in the search space; and a fifth capacity determination unit 5025, configured to determine the size of the search space corresponding to the object according to a signaling notice of a network side.

Further, in this embodiment, the detection module 503 may include: a first detection unit 5031, configured to first detect a search space corresponding to the main object, and continue to detect the search space corresponding to the non-main object if the control channel is detected in the search space corresponding to the main object; and/or a second detection unit 5032, configured to first detect the search space corresponding to the main object, and no longer detect the search space corresponding to the non-main object if no control channel is detected in the search space corresponding to the main object.

Through the UE in this embodiment, for the same aggregation level, different search spaces corresponding to different objects may be determined, and the control channels corresponding to the objects are detected in the search space. Moreover, the case that the UE preferentially detects the search space corresponding to the main object may further reduce the number of times of blind detection. When the search spaces are completely non-overlapped, the UE may judge the object corresponding to the search space by detecting the PDCCH in different search spaces.

Finally, it should be noted that, persons of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are included. The storage medium may be a magnetic disk, an optical disk, a Read Only Memory (ROM), and a Random Access Memory (RAM).

All functional units in the embodiments of the present disclosure may either be integrated in a processing module, or each be a separate physical unit; alternatively, two or more of the units are integrated in one module. The integrated modules may be implemented in the form of hardware or software functional modules. If implemented in the form of software functional modules and sold or used as an independent product, the integrated modules may also be stored in a computer readable storage medium. The storage medium may be a ROM, a magnetic disk, or an optical disk.

The above specific embodiments are not intended to limit the present disclosure. Any modification, equivalent replacement, or improvement made by persons of ordinary skill in the art without departing from the spirit and principle of the present disclosure should fall

What is claimed is:
1. A method for a network equipment device in a multi-carrier system to map a control channel for a user equipment device, wherein the multi-carrier system has N component carriers, the N component carriers include a primary component carrier and N-1 non-primary component carriers, wherein N is an integer greater than 1, the method comprising:
  determining, at a same aggregation level, search spaces on the primary component carrier, wherein each search space corresponds to a component carrier of the multi-carrier system, and a control channel corresponding to the component carrier is to be located in the search space;
  one-to-one mapping control channel(s) to corresponding search space(s) on the primary component carrier, wherein a control channel corresponding to the primary component carrier has a higher mapping priority than control channels corresponding to the N-1 non-primary component carriers; and transmitting the mapped control channel(s) in the corresponding search space(s) on the primary component carrier to the user equipment device;

wherein a starting location of each search space on the primary component carrier is determined according to a component carrier indicator of the component carrier corresponding to the search space, and locations of any two of control channels in corresponding search spaces are unrelated, wherein each search space is composed of a plurality of control channel elements (CCEs), and the number of CCEs included in each search space is larger than the number of CCEs of a Physical Downlink Control Channel (PDCCH) for the aggregation level, and wherein a size of each search space is equal to a size of a standard search space, and the size of the standard search space is predefined for the aggregation level.

2. The method according to claim 1, wherein:
if initial locations of at least two search spaces on the primary component carrier are the same for the same aggregation level, then the sizes of the at least two search spaces are the same and the sizes are larger than that of a standard search space.

3. The method according to claim 1, wherein component carrier indicators of different component carriers are different, and initial locations of search spaces determined according to the component carrier indicators of different component carriers are different.

4. The method according to claim 1, wherein the size of the standard search space fulfills at least one of the following conditions:
the size of the standard search space is 6 CCEs when the aggregation level is 1 CCE;
the size of the standard search space is 12 CCEs when the aggregation level is 2 CCEs;
the size of the standard search space is 8 CCEs when the aggregation level is 4 CCEs; and
the size of the standard search space is 16 CCEs when the aggregation level is 8 CCEs.

5. A method for a user equipment device in a multi-carrier system to detect a control channel, wherein the multi-carrier system has N component carriers, the N component carriers include a primary component carrier and N-1 non-primary component carriers, wherein N is an integer greater than 1, the method comprising:
receiving signals of the primary component carrier from a network equipment device;
determining, at a same aggregation level, search spaces on the primary component carrier, wherein each search space corresponds to a component carrier of the multi-carrier system, and a control channel corresponding to the component carrier is mapped in the search space, and wherein a control channel corresponding to the primary component carrier has a higher mapping priority than control channels corresponding to the N-1 non-primary component carriers; and
detecting, on the primary component carrier, control channel(s) in the search spaces on the primary component carrier;
wherein a starting location of each search space on the primary component carrier is determined according to a component carrier indicator of the component carrier corresponding to the search space, and locations of any two of control channels in corresponding search spaces are unrelated;

wherein each search space is composed of a plurality of control channel elements (CCEs), and the number of CCEs included in each search space is larger than the number of CCEs of a Physical Downlink Control Channel (PDCCH) for the aggregation level; and wherein a size of the search space is equal to a size of a standard search space, and the size of the standard search space is predefined for the aggregation level.

6. The method according to claim 5, wherein:
if initial locations of at least two search spaces on the primary component carrier are the same for the same aggregation level, then the sizes of the at least two search spaces are the same and the sizes are larger than that of a standard search space.

7. The method according to claim 5, wherein component carrier indicators of different component carriers are different, and initial locations of search spaces determined according to the component carrier indicators of different component carriers are different.

8. The method according to claim 5, wherein the size of the standard search space fulfills at least one of the following conditions:
the size of the standard search space is 6 CCEs when the aggregation level is 1 CCE;
the size of the standard search space is 12 CCEs when the aggregation level is 2 CCEs;
the size of the standard search space is 8 CCEs when the aggregation level is 4 CCEs; and
the size of the standard search space is 16 CCEs when the aggregation level is 8 CCEs.

9. A network equipment device in a multi-carrier system, wherein the multi-carrier system has N component carriers, the N component carriers include a primary component carrier and N-1 non-primary component carriers, wherein N is an integer greater than 1, the network equipment device comprising:
a processor, configured to:
determine, at a same aggregation level, search spaces on the primary component carrier, wherein each search space corresponds to a component carrier of the multi-carrier system, a control channel corresponding to the component carrier is to be located in the search space; and
one-to-one map the control channel(s) to corresponding search space(s) on the primary component carrier, wherein a control channel corresponding to the primary component carrier has a higher mapping priority than control channels corresponding to the N-1 non-primary component carriers; and
a transmitter, configured to transmit the mapped control channel(s) in the corresponding search space(s) on the primary component carrier to the user equipment device;
wherein a starting location of each search space on the primary component carrier is determined according to a component carrier indicator of the component carrier corresponding to the search space, and locations of any two of control channels in corresponding search spaces are unrelated;
wherein each search space is composed of a plurality of control channel elements (CCEs), and the number of CCEs included in each search space is larger than the number of CCEs of a Physical Downlink Control Channel (PDCCH) for the aggregation level; and wherein a size of each search space is equal to a size of a standard search space, and the size of the standard search space is predefined for the aggregation level.

10. The network equipment device according to claim 9, wherein:

if initial locations of at least two search spaces on the primary component carrier are the same for the same aggregation level, then the sizes of the at least two search spaces are the same and the sizes are larger than that of a standard search space.

11. The network equipment device according to claim 9, wherein component carrier indicators of different component carriers are different, and initial locations of search spaces determined according to the component carrier indicators of different component carriers are different.

12. The network equipment device according to claim 9, wherein the size of the standard search space fulfills at least one of the following conditions:

the size of the standard search space is 6 CCEs when the aggregation level is 1 CCE;
the size of the standard search space is 12 CCEs when the aggregation level is 2 CCEs;
the size of the standard search space is 8 CCEs when the aggregation level is 4 CCEs; and
the size of the standard search space is 16 CCEs when the aggregation level is 8 CCEs.

13. The network equipment device according to claim 9, wherein the CCEs on the primary component carrier to be used as the search spaces are divided into M sets of CCEs, and each search space corresponds to one set of CCEs respectively.

14. A user equipment device in a multi-carrier system, wherein the multi-carrier system has N component carriers, the N component carriers include a primary component carrier and N-1 non-primary component carriers, wherein N is an integer greater than 1, the user equipment device comprising:

a receiver, configured to receive signals of the primary component carrier from a network equipment device; and a processor, configured to:

determine, at a same aggregation level, search spaces on the primary component carrier, wherein each search space corresponds to a component carrier of the multi-carrier system, and a control channel corresponding to the component carrier is mapped in the search space, and wherein a control channel corresponding to the primary component carrier has a higher mapping priority then control channels corresponding to the N-1 non-primary component carriers; and detect, on the primary component carrier, control channel(s) in the search spaces;

wherein a starting location of each search space on the primary component carrier is determined according to a component carrier indicator of the component carrier corresponding to the search space, and locations of any two of control channels in corresponding search spaces are unrelated;

wherein each search space is composed of a plurality of control channel elements (CCEs), and the number of CCEs included in each search space is larger than the number of CCEs of a Physical Downlink Control Channel (PDCCH) for the aggregation level; and wherein a size of each search space is equal to a size of a standard search space, and the size of the standard search space is predefined for the aggregation level.

15. The user equipment device according to claim 14, wherein:

if initial locations of at least two search spaces on the primary component carrier are the same for the same aggregation level, then the sizes of the at least two search spaces are the same and the sizes are larger than that of a standard search space.

16. The user equipment device according to claim 14, wherein component carrier indicators of different component carriers are different, and initial locations of search spaces determined according to the component carrier indicators of different component carriers are different.

17. The user equipment device according to claim 14, wherein the size of the standard search space fulfills at least one of the following conditions:

the size of the standard search space is 6 CCEs when the aggregation level is 1 CCE;
the size of the standard search space is 12 CCEs when the aggregation level is 2 CCEs;
the size of the standard search space is 8 CCEs when the aggregation level is 4 CCEs; and
the size of the standard search space is 16 CCEs when the aggregation level is 8 CCEs.

18. The user equipment device according to claim 14, wherein the CCEs on the primary component carrier used as the search spaces are divided into M sets of CCEs, and each search space corresponds to one set of CCEs respectively.

* * * * *